(12) United States Patent
Hind et al.

(10) Patent No.: US 9,836,751 B2
(45) Date of Patent: Dec. 5, 2017

(54) SELF-CONTAINED AND AUTOMATED ELIBRARY PROFILING SYSTEM

(75) Inventors: John R. Hind, Raleigh, NC (US); Steven Michael Miller, Cary, NC (US); Patrick P. Reynolds, Morrisville, NC (US); Abdolreza Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 4393 days.

(21) Appl. No.: 10/631,878

(22) Filed: Jul. 31, 2003

(65) Prior Publication Data

US 2005/0027671 A1 Feb. 3, 2005

(51) Int. Cl.
*G09B 5/06* (2006.01)
*G06Q 30/02* (2012.01)

(52) U.S. Cl.
CPC .............. *G06Q 30/02* (2013.01); *G09B 5/06* (2013.01)

(58) Field of Classification Search
USPC ... 707/1–10, 100–104, 200–205, 100–104.1, 707/706–710; 382/305; 705/26
See application file for complete search history.

(56) References Cited

U.S. PATENT DOCUMENTS

| | | | |
|---|---|---|---|
| 6,460,036 B1 | 10/2002 | Herz | 707/10 |
| 6,773,344 B1 * | 8/2004 | Gabai et al. | 463/1 |
| 6,980,977 B2 * | 12/2005 | Hoshi et al. | 707/1 |
| 6,989,815 B2 * | 1/2006 | Liang | G06F 3/016 |
| | | | 345/156 |
| 7,233,684 B2 * | 6/2007 | Fedorovskaya et al. | 382/118 |
| 2001/0044588 A1 * | 11/2001 | Mault | 600/549 |
| 2001/0047298 A1 | 11/2001 | Moore et al. | 705/14 |
| 2001/0054026 A1 | 12/2001 | Choate | 705/52 |
| 2001/0056405 A1 | 12/2001 | Muyres et al. | 705/52 |
| 2002/0009119 A1 * | 1/2002 | Matthew et al. | 374/45 |
| 2002/0040314 A1 | 4/2002 | Tolson | 705/10 |
| 2002/0082997 A1 | 6/2002 | Kobata et al. | 705/51 |
| 2002/0194143 A1 | 12/2002 | Banerjee et al. | 705/400 |
| 2003/0156304 A1 * | 8/2003 | Fedorovskaya | G06F 3/011 |
| | | | 358/527 |
| 2003/0210226 A1 * | 11/2003 | Ho | G06F 3/0483 |
| | | | 345/156 |
| 2004/0069846 A1 * | 4/2004 | Lambert | 235/382 |

(Continued)

FOREIGN PATENT DOCUMENTS

WO  WO 02/01592       1/2002   ............. H01J 13/00
WO  WO 03081408 A1 * 10/2003   ............. G06F 3/0483

OTHER PUBLICATIONS

Andrea Lockerd, Florian Mueller; LAFCam—Leveraging Affective Feedback Camcorder; Apr. 20-25, 2002; ACM.*

(Continued)

*Primary Examiner* — Mark D Featherstone
*Assistant Examiner* — Navneet Gmahl
(74) *Attorney, Agent, or Firm* — Steven M. Greenberg, Esq.; CRGO Law

(57) ABSTRACT

A system and method for reporting a user's behavior and patterns when engaged in use of an electronic consumable. In a preferred embodiment, an electronic consumable such as an electronic book or library includes detectors for collecting biological information from a user. This information is analyzed to identify the user's interests in and reactions to the electronic consumable.

16 Claims, 2 Drawing Sheets

(56) References Cited

U.S. PATENT DOCUMENTS

2004/0101212 A1* 5/2004 Fedorovskaya et al. ..... 382/305
2004/0164975 A1* 8/2004 Ho ........................ G06F 3/0483
                                                    345/204
2004/0181457 A1* 9/2004 Biebesheimer et al. ........ 705/26
2004/0201569 A1* 10/2004 Seet ...................... G06F 3/0483
                                                    345/156

OTHER PUBLICATIONS

U.S. Appl. No. 09/843,070, filed Apr. 26, 2001, Banerjee et al., Method and System for Usage-Based Pricing of E-Content.
U.S. Appl. No. 10/062,105, filed Jan. 31, 2002, Bibelnieks et al., System, Method, and Computer-Program Product for Realtime Profiling of Web Visitors.

* cited by examiner

SELF-CONTAINED AND AUTOMATED ELIBRARY PROFILING SYSTEM

BACKGROUND OF THE INVENTION

1. Technical Field

The present invention relates generally to consumer data collection, and more particularly to profiling and analysis of consumer response during consumption of an "electronic consumable" product.

2. Description of Related Art

Businesses collect information on consumer activities in order to tailor products to consumer tastes. Often, providers of services or products collect and store data and statistics on the type of services mostly used and requested by users, in order to improve the quality of services and attract more users. Collected information can include, for example, popular authors, frequently viewed titles, etc.

However, the data collected is often not true or does not reflect the correct information about the user's behavior or use of the services. This can result in a business stocking items not as popular as thought, or stocking items beyond actual demand. The data currently collected may not accurately account for cases where, for example, a book is checked out but is never read, or a book is checked out and only the first chapter is read before the reader loses interest. In such cases, a service or product provider may mistakenly conclude that the item checked out was of interest to the user, when in reality, it was not.

In today's competitive eBusiness environment, accuracy of data collected is a matter of necessity and survival in the marketplace. Businesses make hefty investment in collecting accurate data to improve on their Return on Investment (ROI).

Therefore, the state of the art would be improved by the addition of a mechanism to collect data as accurately as possible, one which collects information that is truly representative of the user's behavior, likes, dislikes, and preferences, to thereby enable service and product providers to make appropriate decisions and planning.

SUMMARY OF THE INVENTION

The present invention teaches a system and method for collecting, reporting and analyzing information about user interaction with electronic consumables. Electronic consumables, as that term is used in the present invention, includes subject matter that is transferable and displayable using electronic means, such as an eBook or other element of an eLibrary.

In a preferred embodiment, the present invention comprises an electronic library (eLibrary for short) profiling system whose documents (eBooks) and content elements (objects) take an active role in reporting how they are used by the library customer, thereby allowing the eLibrary and its respective content authors to discover a user's interests and reactions while consuming the content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is described with reference to the figures. Though not limited to these examples, the innovative system and method are described with reference to a preferred embodiment, the eLibrary and eBook system. In this preferred embodiment, the innovative eLibrary profiling system includes object collections, referred to herein as eBooks. Examples of eBooks include Microsoft office documents, which are a collection of embedded objects representing such things as text, rich text paragraphs, or graphics and images.

Figure 1:
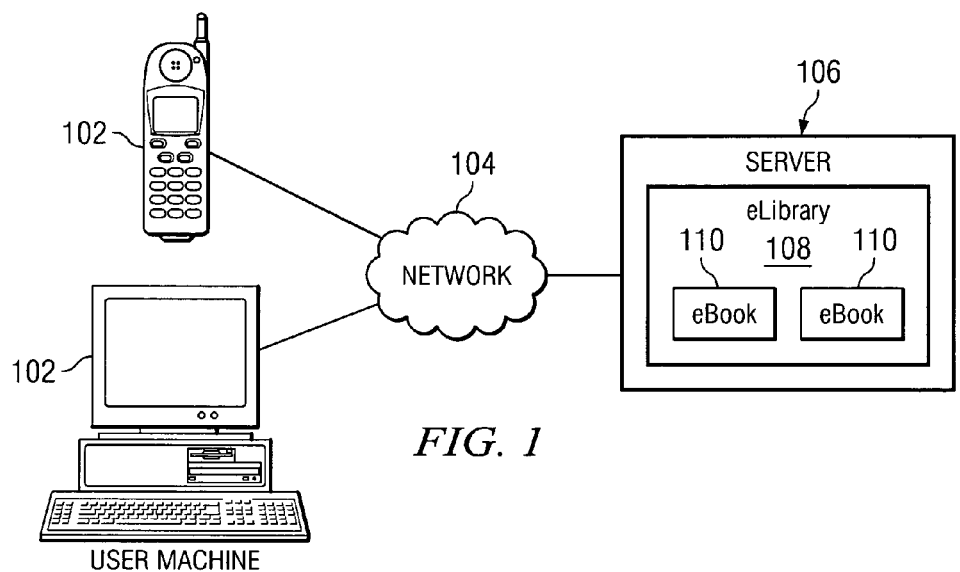
FIG. 1 shows an example network system consistent with a preferred embodiment of the present invention.

FIG. 1 shows a diagram of one possible implementation of the innovative eLibrary system. In this example, eLibrary 108 is accessed by a user across network connection 104 from user machine 102. The eLibrary 108 is preferably embodied on server 106 or other information processing system capable of fulfilling requests by clients 102 for documents 110 of the eLibrary. Client machine 102 preferably comprises a computer with input devices capable of monitoring the user, as described more fully below.

Documents obtained from the eLibrary can be read or viewed (or otherwise "consumed", including playing audio or interacting with the content in whatever way) from the user machine while online—i.e., connected to the eLibrary—or offline, such as if the user downloads the content and then disconnects from the network. Reporting of user information in such cases is delayed until the user connects to the network again, as described more fully below.

Figure 2:
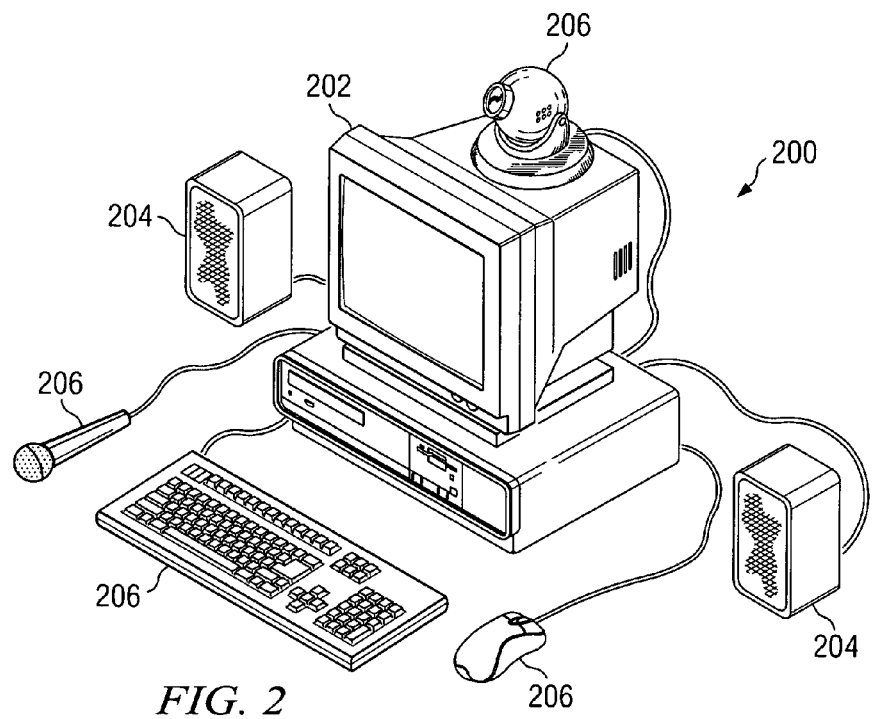
FIG. 2 shows a preferred embodiment of an apparatus for viewing content of the eLibrary.

FIG. 2 depicts a preferred embodiment of an apparatus for viewing content of the eLibrary, such as eBooks. Apparatus 200 is an information processing system capable of displaying the content of the eBook using, for example, video display 202 and audio output 204 (such as speakers). Apparatus 200 is preferably capable of connecting to a network, as depicted in FIG. 1. Apparatus 200 also preferably includes input devices (e.g., keyboards, mouse, audio input) 206 or data collection devices (for example, webcam, infra red detector, other sensors) 206 capable of collecting information about the user when such collection is invoked, for example, by the user performing predefined actions that are recognized as calling such data collection. Collection devices/input devices 206 may also collect information on a continuous basis, or on a timed basis as well, and are preferably not limited to data collection only when invoked.

By observing the user's behavior and patterns of using the library items (using reports from the objects and sensors embedded in the physical apparatus of the library), biological data is gathered that more accurately represents the user's interests and avoids data that is misleading about the user's interests. Documents, objects, and other elements of the eLibrary actively report information about their usage by the user. This data is analyzed to detect patterns and other behavior by such techniques as data mining. Information is preferably maintained so as to be associated with the individual user from whom it was collected, and also aggregated to identify trends as they relate to the individual eBook or elements of the eBook.

In a preferred implementation, the eLibrary includes eBooks that are composed of a collection of active content elements that are activated when a user reads or otherwise uses them, for example, by reading a paragraph or displaying a figure on the display device. The elements not only contain content but also instructions for what monitoring should occur and how this information should be reported.

Data collection can happen automatically, or be invoked by the user's own actions and responses to those actions by embedded controls in predetermined parts of the eBook. In this way, the content of the eBook takes an active role in reporting how it is being used. This allows the eLibrary system and its respective content authors to more accurately discover a user's interests and reactions. The data collected is analyzed to determine the user's behavior and to discern patterns. In a preferred embodiment, the eBook comprises a collection of active content elements which are activated when a user reads or otherwise uses a portion of the eBook, such as viewing a paragraph or figure on a display device. The content elements contain not only the displayable content, but also instructions for what monitoring should occur and how this information should be reported, for example, to the eLibrary. Reporting mechanisms also preferably allow for delayed transmission of collected data, so that when content is viewed offline (i.e., while the user's machine is not connected to a network), the collected data can be recorded or stored and subsequently sent across a network connection, once one is established. For example, a user may download content to a tablet PC, then go offline to consume the content. As the consumer reads the eBook, interacting with the elements therein by viewing them, clicking on clickable elements, etc., data about the user's behavior, actions, and reactions is collected and stored locally. Then, when the user docks the tablet PC and connects to a network that includes (for example) the eLibrary, the connection is detected and the collected data is transmitted across the network.

Copying of elements from an eBook is preferably restricted to containers that can support the active monitoring aspect of the present invention, for example, into a personal notebook or office document that is compatible with the embedded reporting instructions of the object or element.

In a preferred embodiment, the content elements of an eBook map to new aspects of objects within the object collection representing the eBook. The innovative eBook elements include special programming that provide start and stop controls embedded in those parts of the eBook. For example, an object including such embedded controls would be activated by a predetermined user action, such as accessing a particular paragraph of text for display, or opening a clickable object such as a graphic image within the text. Once an object's embedded controls are activated, a predetermined action takes place. For example, such actions can include recording the duration a user spends on a given page, or activating input devices such as a webcam or audio device to receive video and audio input from the user.

Reporting of the information collected by the system can be accomplished in several ways. For example, such remote agent access systems such as Java Dynamic Management allows access to agents and resources easily across a network connection or otherwise from a remote application. Other types of remote reporting are consistent with the innovations disclosed herein, and the particular implementation of remote reporting is not intended to limit the application of these ideas.

Figure 3:
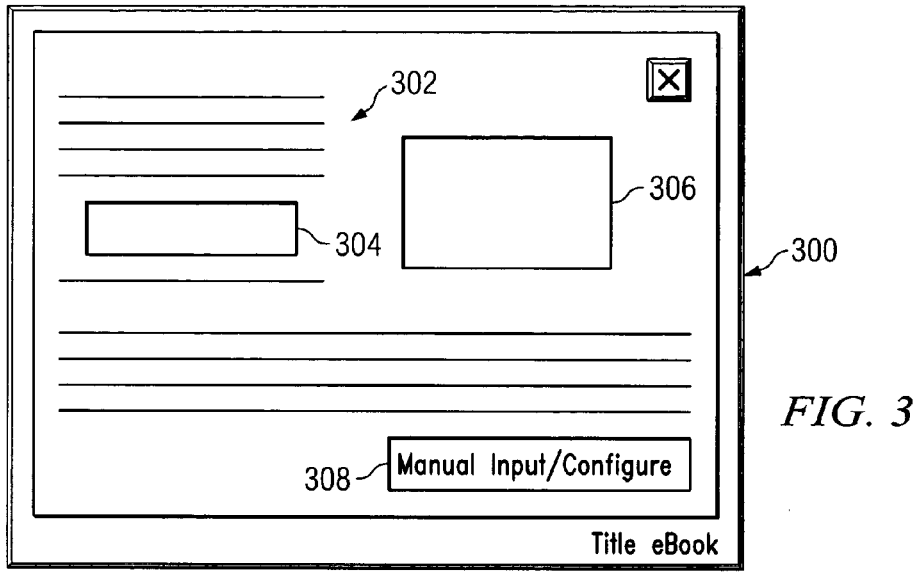
FIG. 3 shows an example of content for the innovative system, consistent with a preferred embodiment.

FIG. 3 shows an example of content for the innovative system. In this example embodiment, the content of an eBook is shown in application window 300. In this example, eBook includes text 302, hyperlink 304 embedded in text 302, and image 306 which links to other information, such as more details in text form about image 306. In such an example, the innovative system records various information about the user's interaction with this page of the eBook. For example, the amount of time the user spends reading this page, whether hyperlink 304 was clicked, whether image 306 was clicked, and whether the reader stopped reading at this page can be recorded. Actions the user takes with respect to the content can trigger recording of these events, by virtue of embedded code that is part of the eBook and its individual objects. Likewise, the user's behavior can be recorded continually, noting behavior such as duration spent viewing particular windows or pages of the eBook.

The innovative system not only collects such information about user actions, it also actively records user behavior using input devices and sensors 206 (see FIG. 2) while the user consumes the eBook. Such recording or information collection can be triggered by code embedded in elements of the eBook, or can be set to occur at timed intervals, for example. For example, when the user views the page, audio input devices (such as a microphone) record the user's voice if they speak while using the eBook. Other bio-information can be collected, including video images of the user (for example, using a webcam), or even body temperature or stress levels (using such devices as an IR camera or stress tester sensors). Such sensors are preferably part of a physical apparatus used to view the eBook.

Data reported using the innovative system and method is preferably transferred to a central location, such as a server. Such reporting can be real time, continuous, periodic, or set to occur when next a user connects to the network, for example. Collected data is preferably subject to relevant analysis. For example, user facial expressions are analyzed by a facial expression recognition algorithm or program designed to identify pleasurable or non-pleasurable expressions such as fear or anger. Audio data can be analyzed to identify whether the user is pleased or otherwise interested in the content being viewed. Of course, such data is preferably correlated with the section of the eBook being viewed when it was recorded, so that content authors and vendors can properly associate the recorded data with the media or part of the eBook that prompted such response from the user.

In preferred embodiments of the present invention, the user of the system is able to control the reporting done. Users may be reluctant to allow video images to be made of them in some settings (e.g., reading in bed), and the present invention preferably allows users to customize the reporting they would like to have performed. Users can use the present invention to facilitate easy feedback to a content author about the work. For example, the innovative system can prompt the user at intervals or after triggering actions for audio input describing what the user thinks about a particular element of the eBook. The innovative system also preferably includes an easy interface for the user to provide input for collection, such as Manual Input/Configuration button 308. Pressing the button provides the user with automatic voice recording, for example, or can provide a prompt for the user to enter information in other ways, such as text. This information is collected and reported along with the other information collected by the system.

Information collected by the innovative system of the present invention is reported and analyzed. Techniques such as data mining are preferably used to identify patterns in the data useful for content authors and advertisers. Information can be treated differently according to how it was acquired. For example, data collected from a webcam that captures a user's facial expression can be analyzed by a program designed for recognizing such expressions. This data can then be analyzed and compared to similar data from other users who consumed the same eBook product and element. the sum total of such information can be analyzed to provide aggregate user data, or it can be analyzed in an individual bases to add to a profile of information on an individual user. In other words, information collected can be associated with the individual from which it was collected, and also combined with similar information from other users to provide a profile of responses from multiple users about the eBook itself or an individual part of the eBook.

The data collected by the sensors or input devices (see 206 of FIG. 2) can be of several forms, depending on what types of devices are available on the user machine. For example, a mouse can be equipped with sensors capable of detecting increases in body heat in the user, or of detecting heart rate of the user. Such information can be used to determine reactions of the user beyond normal marketing data collection systems. Patterns of behavior can be detected, such as long elapsed time a user spends on a particular area of the eBook. Other information may also be collected and discerned from analysis, such as a reader's body and facial movement, like frowns or eyes wide open, expressions or gestures, and other physiological signs of interest. For example, a sensor on a mouse can collect heart rate information, which can be analyzed and correlated with the particular section of the eBook being used at that time to determine if the person was scared by a part of the book that was supposed to be scary, or excited at the climax of the story. Voice data can also be collected and analyzed, recording the actual spoken reactions of a user.

As mentioned above, in a preferred embodiment, such data collection is capable of being turned on or off by the user, for example, by manipulating a control program designed to control such features, or more simply by turning off some or all of the data collection devices 206. In a preferred embodiment, the user is provided with means to accomplish such configuration, such as a configuration panel or window accessible through a program on the apparatus used to view the content.

Figure 4:
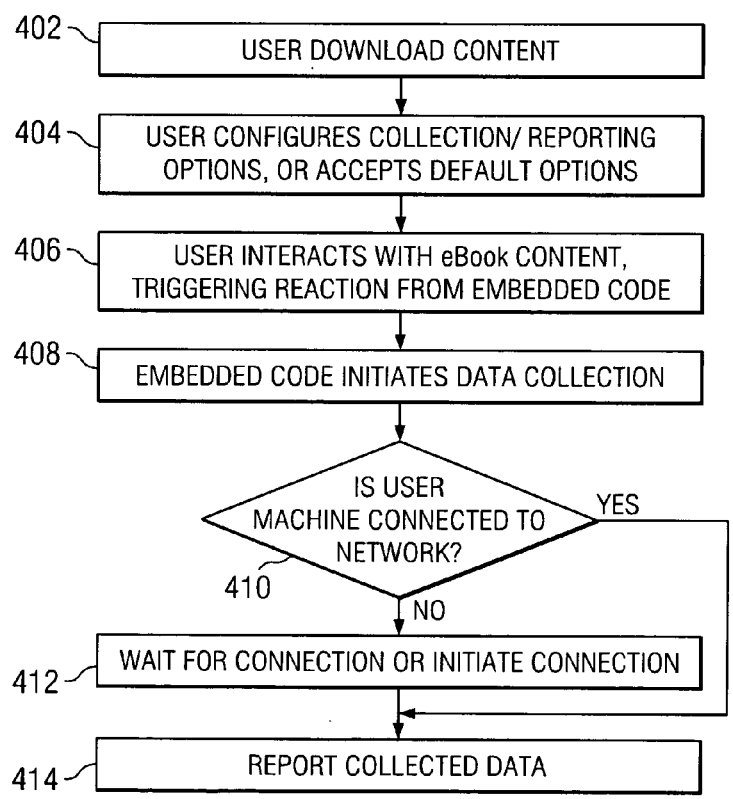
FIG. 4 shows a flowchart for implementation of the present invention.

FIG. 4 shows a flowchart for practice of one embodiment of the present invention. The process begins with the user downloading content from the eLibrary (step 402). Sometime thereafter, the user is given the option to configure the data reporting and collecting options of the eLibrary system (step 404). The user may also accept default options for this step. When the user interacts with the eBook and its content, embedded code is triggered (step 406). This interaction causes the embedded code to initiate data collection (408). Note that this data collection may be in addition to the ubiquitous data collection that goes on in the background of the system, which records duration the eBook is used, and other non-event triggered data collection performed by the system. If the user's machine is connected to the network (e.g., the Internet) (step 410), the system reports the collected data (step 414). If the machine is not connected to the network, the system either waits for a connection to be established, or if the system is so equipped (or if the user has selected such option when configuring the system), the innovative system initiates its own connection to the Internet (step 412) and then reports collected data (step 414).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for collecting information about a user of an electronic consumable, comprising:
   an apparatus, the apparatus having an input device and a multiplicity of sensors, memory and at least one processor;
   an electronic consumable in the form of an eBook displayed in the apparatus, wherein the electronic consumable comprises a multiplicity of different objects, each object comprising either a paragraph or a figure of the eBook; and,
   biological data gathering program code executing in the memory of the apparatus, the program code programmed to cause a processor set to perform operations including the following:
   detecting an end user accessing one of the objects and responding to the detection by
   inspecting embedded code in the one of the objects to identify one of the multiplicity of the sensors and a reporting preference for data collected through the one of the multiplicity of the sensors,
   activating the identified one of the multiplicity of the sensors, obtaining biological data of the end user through the activated one of the multiplicity of the sensors, and
   reporting the obtained biological data as specified by the reporting preference of the embedded code in the one of the objects.

2. The system of claim 1, wherein the multiplicity of the sensors are sensors selected from the group consisting of:
   a webcam, an infra red camera, an audio input, a video input, and a temperature sensor.

3. The system of claim 1, wherein the biological data is reported to a remote location.

4. The system of claim 1, wherein each of the objects of the electronic consumable can only be stored in containers that allow the embedded code of the object to function.

5. A system for collecting information about a user of an electronic consumable, comprising:
- an apparatus capable of displaying an electronic consumable, the apparatus having an input device, memory, at least one processor and a multiplicity of sensors;
- an electronic consumable in the form of an eBook displayed in the apparatus, the electronic consumable comprising documents and objects each that include either a paragraph or a figure of the eBook;
- wherein the documents are displayed on the apparatus and the objects include embedded instructions for automatically monitoring and reporting user behavior of a user while consuming the electronic consumable, wherein the objects specifies (i) what type of monitoring of user actions should occur while the user is consuming the electronic consumable and (ii) how the user behavior should be reported; and
- biological data gathering program code executing in the memory of the apparatus, the program code programmed to cause a processor set to perform operations including the following:
- detecting an end user accessing one of the objects and
- responding to the detection by inspecting the embedded code in the one of the objects to identify one of the multiplicity of the sensors and a reporting preference for data collected through the one of the multiplicity of the sensors,
- activating the identified one of the multiplicity of the sensors,
- obtaining biological information of the user through the activated one of the multiplicity of the sensors and
- reporting the obtained biological information as specified by the reporting preference of the embedded code in the one of the objects.

6. The system of claim 5, wherein the biological information comprises how long the user looked at a first page of the document.

7. The system of claim 5, wherein biological information comprises the time between the user opening an object and closing the one of the objects.

8. The system of claim 5, wherein the one of the multiplicity of sensors is an infra red sensor, and wherein the biological information comprises the body temperature of the user as determined from the one of the multiplicity of sensors.

9. The system of claim 5, wherein the one of the multiplicity of sensors is a camera, and wherein the biological information comprises facial expressions of the user.

10. The system of claim 9, wherein the facial expressions are classified according to a facial expression recognition algorithm.

11. The system of claim 5, wherein the user behavior is analyzed using data mining techniques.

12. The system of claim 5, wherein the objects can only be stored in containers that allow embedded code of the object to function.

13. The system of claim 5, wherein the user can configure the collection and reporting of information by the system.

14. A method of collecting information about a user of an electronic consumable, comprising the steps of:
- storing the electronic consumable on an apparatus comprising a display, memory, a multiplicity of sensors and at least one processor, the apparatus displaying an electronic consumable in the form of an eBook that includes different objects, each of the objects including a paragraph or a figure of the eBook;
- displaying the electronic consumable in the display of the apparatus; and,
- detecting an end user accessing one of the objects and responding to the detection by:
  - inspecting embedded code in the one of the objects to identify one of the multiplicity of the sensors and a reporting preference for data collected through the one of the multiplicity of the sensors,
  - activating the identified one of the multiplicity of the sensors,
  - obtaining biological data of the end user through the activated one of the multiplicity of the sensors and
  - reporting the obtained biological data as specified by the reporting preference of the embedded code in the one of the objects.

15. The method of claim 14, wherein the sensors are selected from the group consisting of:
a webcam, an infra red camera, an audio input, a video input, and a temperature sensor.

16. A computer program product for collecting information about a user of an electronic consumable, the computer program product comprising:
- a non-transitory computer readable storage medium, having computer readable program code embodied therewith, the computer readable program code comprising:
- computer readable program code for storing the electronic consumable on an apparatus comprising a display, memory, a multiplicity of sensors and at least one processor, the apparatus displaying an electronic consumable in the form of an eBook that includes different objects, each of the objects including a paragraph or a figure of the eBook;
- computer readable program code for displaying the electronic consumable in the display of the apparatus; and,
- computer readable program code for detecting an end user accessing one of the objects and responding to the detection by:
  - inspecting embedded code in the one of the objects to identify one of the multiplicity of the sensors and a reporting preference for data collected through the one of the multiplicity of the sensors,
  - activating the identified one of the multiplicity of the sensors,
  - obtaining biological data of the end user through the activated one of the multiplicity of the sensors and
  - reporting the obtained biological data as specified by the reporting preference of the embedded code in the one of the objects.

* * * * *